United States Patent [19]

Eggert

[11] Patent Number: 5,282,732
[45] Date of Patent: Feb. 1, 1994

[54] MOLD PRESS ASSEMBLY

[75] Inventor: Horace Eggert, Hampton, N.H.

[73] Assignee: Davidson Textron Inc., Dover, N.H.

[21] Appl. No.: 865,293

[22] Filed: Apr. 8, 1992

[51] Int. Cl.⁵ .................................................. B29C 43/00
[52] U.S. Cl. ....................................... 425/153; 100/228; 100/289; 425/167; 425/188; 425/193; 425/451.7
[58] Field of Search .............. 100/219, 228, 233, 289; 264/40.5; 425/150, 153, 167, 188, 193, 195, 406, 409, 429, 435, 441, 450.1, 451.7, 451.9, 576, 411, 589

[56] References Cited

U.S. PATENT DOCUMENTS

| | | | |
|---|---|---|---|
| Re. 30,130 | 10/1979 | Edwards | 425/453 |
| 1,872,158 | 8/1932 | Maynard . | |
| 2,370,294 | 2/1945 | Dodge | 425/411 |
| 2,812,543 | 11/1957 | Stacy | 425/406 |
| 3,142,093 | 7/1964 | Tribbett | 425/406 |
| 3,720,492 | 3/1973 | Hehl | 425/188 |
| 3,981,671 | 9/1976 | Edwards | 425/451.9 |
| 4,082,492 | 4/1978 | Kurreck | 425/451 |
| 4,105,379 | 8/1978 | Gazuit | 425/47 |
| 4,191,523 | 3/1980 | Niederst et al. | 425/589 |
| 4,269,587 | 5/1981 | Tranter | 425/409 |
| 4,337,026 | 6/1982 | Taubenmann et al. | 425/451.9 |
| 4,360,335 | 11/1982 | West | 425/406 |
| 4,395,213 | 7/1983 | Springs et al. | 425/150 |
| 4,504,208 | 3/1985 | Kurumaji et al. | 425/450.1 |
| 4,696,632 | 9/1987 | Inaba | 425/150 |
| 4,702,688 | 10/1987 | Schenk | 425/450.1 |
| 4,708,625 | 11/1987 | Arend | 425/589 |
| 4,726,754 | 2/1988 | Breuker et al. | 425/409 |
| 4,798,525 | 1/1989 | Sato et al. | 425/84 |
| 4,891,002 | 1/1990 | Inaba et al. | 425/556 |
| 4,976,602 | 12/1990 | Yamazaki | 425/188 |
| 5,052,908 | 10/1991 | Inaba et al. | 425/150 |

FOREIGN PATENT DOCUMENTS 2002308   7/1971   Fed. Rep. of Germany ... 425/451.9

*Primary Examiner*—Charles S. Bushey
*Attorney, Agent, or Firm*—Reising, Ethington, Barnard, Perry & Milton

[57] ABSTRACT

A mold press assembly has an outer press frame carrying first and second inner frames that are interlocked to the press frame during relative vertical movements of an upper platen and a lower platen for defining a throat distance for receiving mold parts connected thereto and the first and second inner frames connect on first and second drive shafts for pivotal booking movement. The shafts are connected at one end to an electric motor and connected at other points therealong to ball screws for vertically positioning an upper platen with respect to the outer press frame and for reciprocating the lower platen outwardly with respect to the pivoted second inner frame; and the first and second inner frames are driven by other ball screws and electric motors to pivot about the first and second drive shafts for providing access to mold parts connected to the upper and lower platens.

15 Claims, 4 Drawing Sheets

MOLD PRESS ASSEMBLY

TECHNICAL FIELD

The present invention relates to mold presses and more particularly to mold presses for carrying various forms of mold parts at different vertical height relationships with respect to a mold press frame while further providing drives and supports for positioning upper and lower platens for ease of access to operators for replacing mold parts and for removing finished parts from the mold press assembly.

BACKGROUND ART

Various mold presses are known in which upper and lower platens are vertically reciprocated by hydraulic cylinders for maintaining pressure on the mold parts during a mold process. In such cases it is also known to include hydraulic drives for pivoting the platens in so called booking presses to provide access to the platens for removing finished parts from the mold press.

Also, various presses used in the manufacture of tires are known in which drive screws are used to open and close the press.

Additionally, it has been proposed to drive mold halves through ball screw actuators driven by electric motor energy.

While the various proposals are suitable for their intended purpose, none of the known mold press apparatus include a compact, all electric drive and ball screw actuation system for providing both vertical positioning and pivotal/reciprocation of the platens.

SUMMARY OF THE INVENTION

The present invention includes a combined electric drive and ball screw actuation system in a mold press for performing all the platen drive functions in a mold press. One of the ball screw drives is mounted to pivot with swing plates so as to provide for outward projection of a mold lid or mold core on a pivoted upper platen and the other of the ball screw drives is mounted to pivot with a lower platen carriage and thereafter project the lower platen outwardly to present the mold cavity part to an operator.

A feature of the present invention is to improve a mold press having vertically moveable upper and lower platens adapted to carry mold parts and a press frame for supporting the upper and lower platens for vertical movement by the provision of first and second ball screws located at opposite sides of the press frame and extending vertically with respect thereto and nuts supported on the upper platen at the mid-point of each side thereof engaging the ball screws; and by the further provision of a first electric drive motor and a drive shaft connected thereto extending across the width of the press frame and through spaced swing plates forming sides of an inner frame; and wherein bevel gears are provided to couple the drive shaft to each of the first and second ball screws for causing rotation of the drive shaft to drive the ball screws with respect to the nuts for vertically reciprocating the upper platen with respect to both the press frame and the swing plates; and wherein the swing plates support the upper plenum, the first and second ball screws, the nuts and the bevel gears for concurrent pivotal movement and wherein the drive shaft is directed through the swing plates for pivoting the upper platen with respect to the press frame for access to the mold part connected to the upper platen and wherein the ball screws are operative to position the upper platen into variable positions following pivotal movement thereof into a booked position.

A further feature of the present invention is to provide a mold press as set-forth in which the pivot movement of the upper plenum is caused by a third ball screw, a second drive motor and a nut on the inner frame at a point offset from the drive shaft for forming a crank for pivoting the inner frame with respect to the drive shaft for providing outward pivoting movement of the inner frame with respect to the press frame for accessing the mold parts connected to the upper platen.

A still further feature of the present invention is the provision of a mold press as set-forth including a reciprocable lock pin and a lock plate connected respectively to the press frame and the swing plates for interlocking the swing plates to the press frame during vertical reciprocation of the upper plenum with respect to the press frame.

Yet another feature of the present invention is the provision of a mold press as set-forth including a second drive shaft for pivotally supporting the lower platen with respect to the press frame following outward pivoting movement of the inner frame for providing access to a mold part on the lower platen.

Still another feature is to mount the lower platen on a second set of swing plates forming part of a second inner frame that is pivotal on the press frame and to further mount the lower platen for reciprocating the lower platen with respect to the second inner frame for accessing the mold part connected to the lower platen.

Another feature is to provide such a mold press including the further feature of a drive for pivoting the lower platen with respect to the press frame following outward pivoting movement of the second inner frame for providing access to a mold part on the lower platen; the drive including a third electric drive motor and a vertically oriented ball screw and a second drive shaft extending across the width of said press frame; the vertically oriented ball screw pivoting the lower platen and the second drive shaft forming an axis for upward pivotal movement of the lower platen.

Another feature is to provide such a mold press including the further feature of a drive for pivoting the lower platen with respect to the press frame including a pivotal frame and a drive for reciprocating the lower platen with respect to the pivotal frame for accessing the mold part connected to the lower platen; a second drive including a third electric drive motor and a second drive shaft extending across the width of the press frame; spaced ball screws supported on the pivotal frame and a nut connected to the lower plenum threadably engaging the spaced ball screws for causing the lower platen to be reciprocated into and out of the pivotal frame while providing access to the mold part on the lower platen.

Other advantages of the present invention will be readily appreciated as the same becomes better understood by reference to the following detailed description when considered in connection with the accompanying drawings wherein:

DETAILED DESCRIPTION OF A PREFERRED EMBODIMENT OF THE INVENTION

Figure 1:
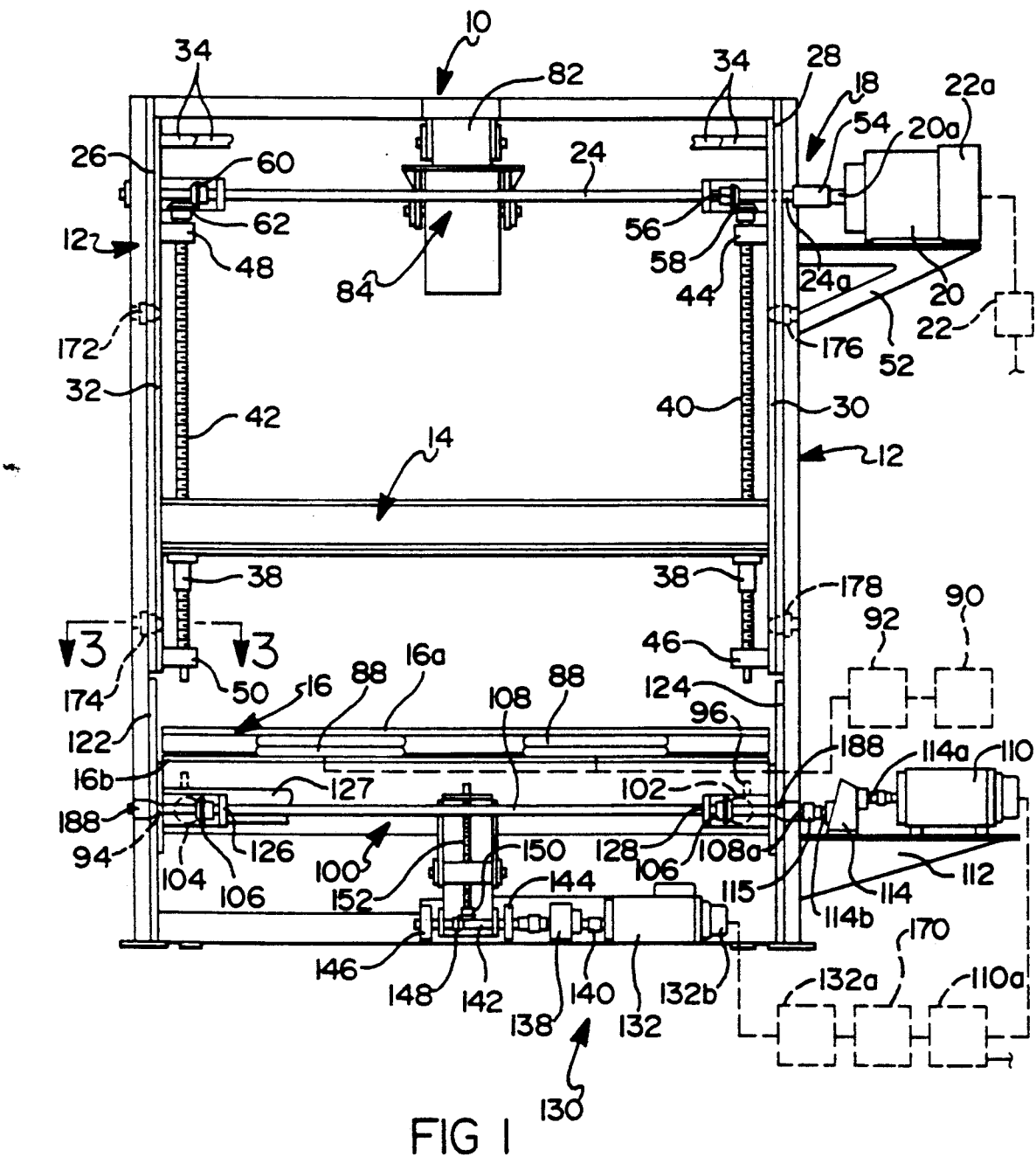
FIG. 1 is a front elevational view of a mold press constructed in accordance with the present invention.
Figure 2:
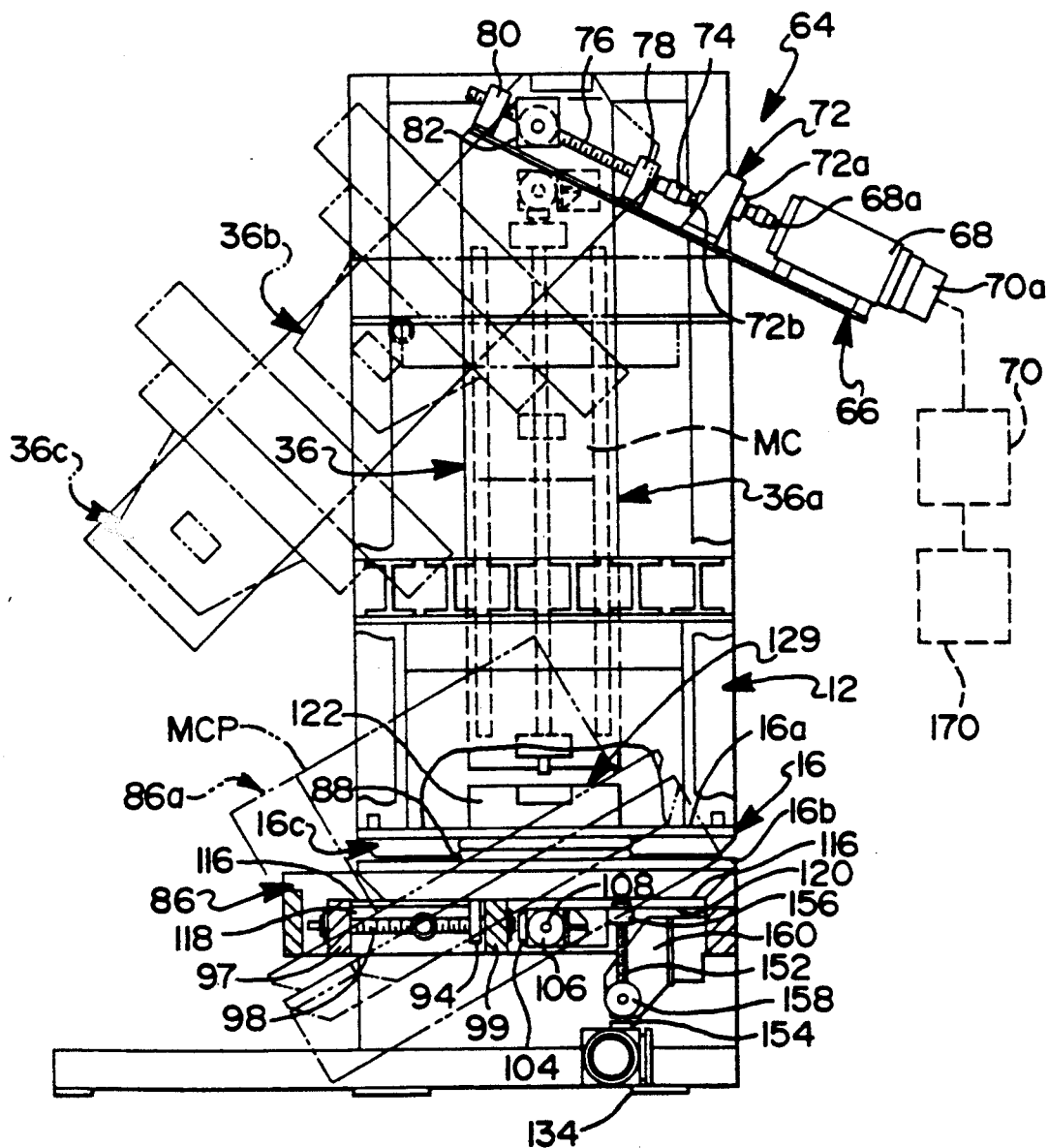
FIG. 2 is a side elevational view of a mold press, partially broken away showing the operative positions of the upper and lower platens therein.
Figure 3:
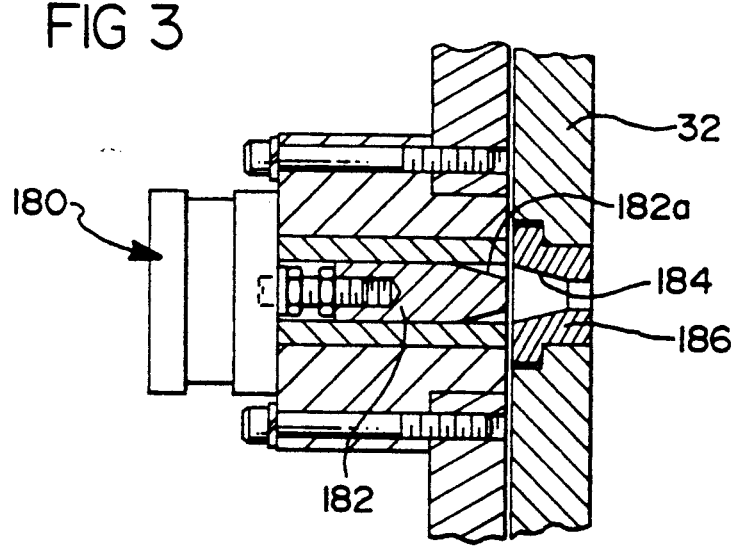
FIG. 3 is an fragmentary sectional view taken along the line 3—3 of FIG. 1 looking in the direction of the arrows.
Figure 4:
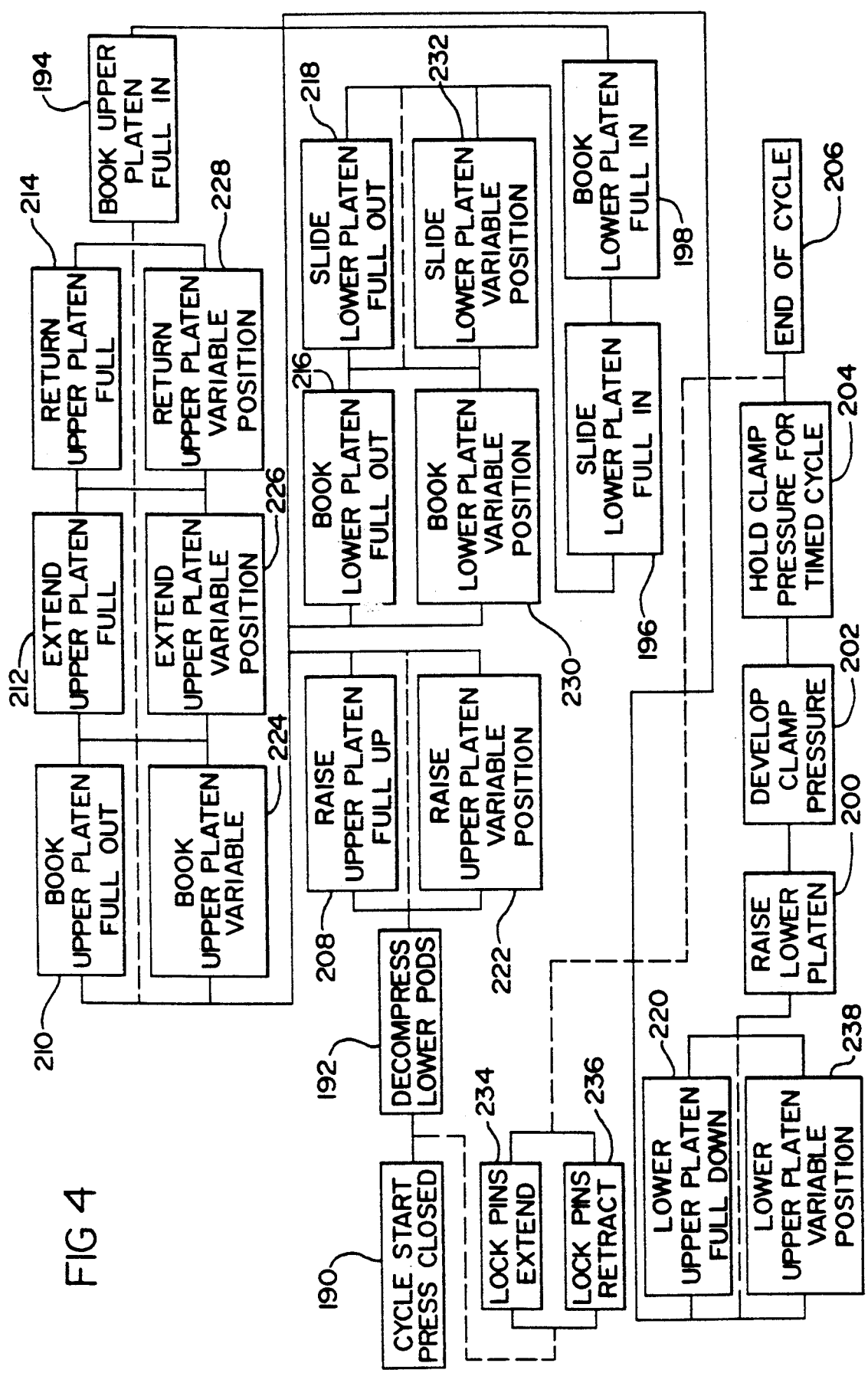
FIG. 4 is a process flow chart describing the operation of the mold press in FIGS. 1–4.

Referring now to FIGS. 1 and 2, a mold press 10 is illustrated having an outer tube frame 12 that encloses an upper platen 14 and a lower platen 16.

The upper platen 14 is connected to a first ball screw drive system 18 that is operated by a first electric drive motor 20 under the control of a motor controller 22 that will control a motor brake and motor drive. The motor controller 22 in one preferred embodiment is an Allen Bradley 1336-BO30-EOF-L2 Adjustable Frequency AC Drive. The position of the drive system 18 is determined by an encoder 22a. More specifically, the electric drive motor 20 is connected to a drive shaft 24 that extends across the width of the press frame 12 at the upper end thereof as best seen in FIG. 1. The drive shaft 24 is journaled at its opposite ends in side frame members 26, 28 that are fastened to the press frame 12. The drive shaft 24 also extends through bores in swing plates 30, 32 located on either side of the press frame 12. The swing plates 30, 32 are connected by cross braces 34 to form a first inner frame assembly 36, generally designated in FIG. 2, that is pivotal with respect to the outer press frame 12 about the axis of the drive shaft 2+.

The first ball screw drive system 18 is mounted for pivotal movement with the inner frame assembly 36 as is the upper platen 14. More particularly, the upper platen 14 has a nut 38 connected to each side thereof at the underside of the platen 14. Each nut 38 is threadably engaged to a first and a second ball screw drive 40, 42. The nuts 38 constitute first and second drive nuts in the combination. The ball screw drive 40 has its opposite ends journaled in brackets 44, 46 connected to the inner surface of the swing plate 30 and the ball screw drive 42 has its opposite ends journaled in brackets 48, 50 connected to the inner surface of the swing plate 32. The motor 20 is carried on a side bracket 52 extending to one side of the upper end of the press frame 12. Its output shaft 20a is connected by a coupling 54 to an outboard end 24a of the drive shaft 24. The drive shaft 24 is connected to a bevel gear 56 that meshes with a bevel gear 58 connected to the upper end of the ball screw drive 40. The drive shaft 24 is also connected to a bevel gear 60 that meshes with a bevel gear 62 connected to the upper end of the ball screw drive 42. By virtue of the above-described first ball screw drive system 18, opposite rotation of the motor 20 will drive the upper platen 14 vertically up and down with respect to the lower platen 16.

The mold press 10 further includes a second ball screw drive 64 best shown in FIG. 2 as mounted on a rear frame 66 on the upper end of the inner frame assembly 36. The drive 64 includes an electric drive motor 68 controlled by a motor controller 70 that in one embodiment is an Allen Bradley 1318-BOA 030 Single Phase Regenerative DC Drive Control including a motor brake and a tachometer. The motor controller 70 is associated with an encoder 70a for counting the revolutions of the motor so as to establish the adjusted position of the inner frame assembly 36 during a booking operation to be described.

The motor 68 has its output shaft 68a connected to a gear reducer unit 72 at the input shaft 72a thereof and the output shaft 72b thereof is connected to a coupling 74 that is connected to one end of a third ball screw 76 having its opposite ends journaled in support brackets 78, 80 connected to the upper surface of the rear frame 66. The third ball screw 76 is threaded within a third drive nut 82 connected to the cross brace 34 to define a crank arm for rotating the inner frame assembly 36 about a pivot axis defined by the drive shaft 24. The inner frame assembly 36 is pivotally connected to the drive shaft 24 by a pivot bracket 84 best shown in FIG. 1.

The position of the inner frame assembly 36 for applying vertical pressure to a mold lid on the upper platen 14 and a mold cavity part on the lower platen 16 is shown in solid line at 36a in FIG. 2. During a booking operation the inner frame assembly 36 is moved to an outwardly inclined "booked" position shown in broken line outline at 36b in FIG. 2.

One feature of the present invention is that the ball screws 40, 42 and the drive shaft 24 are free to rotate with the inner frame assembly 36. Accordingly, the upper platen vertical drive motor 20 serves the dual function of providing a vertical drive of the upper platen and a variable positioning of the pivoted upper platen 14 in its booked position as shown at 36c in FIG. 2.

Another feature of the present invention is that the lower platen 16 is supported on a carriage 86. The platen 16 includes an upper plate 16a carried by inflatable platen air pods 88 with respect to a lower platen base 16b. The air pods 88 are connected to a suitable source of pressure 90 under the control of a pneumatic controller 92 to either inflate the air pods 88 or deflate same for controlling the clamping pressure and to compensate for tolerance differences in dimensions of the mold parts connected respectively to the upper and lower platens 14, 16.

The lower platen base 16b is connected to a pair of fifth nuts 94, 96 on either side thereof and the nuts 94, 96 each are threadably connected to a fifth ball screw 98 (one shown in FIG. 2) journaled in a pair of brackets 97, 99 on each side of the carriage 86. The ball screws 98 comprise part of a ball screw drive system 100. The system 100 includes a bevel gear 102, 104 connected at the end of each ball screw 98 as shown in FIG. 2. Each of the bevel gears 102, 104 are meshed with bevel gears 106 connected to a second drive shaft 108 extending across the width of the press frame 12 at the bottom thereof and having the opposite ends thereof journaled therein as shown in FIG. 1. A fifth electric drive motor 110 is carried on a side bracket 112 from the press frame 12 as shown in FIG. 1. The electric drive motor is controlled by a controller 110a provided in one embodiment of the invention as an Allen Bradley 1318-BOA 030 Single Phase Regenerative DC Drive Control to provide in and out slide movement of the lower platen 16 in a manner to be described.

The electric drive motor 110 is connected to a gear reduction unit 114 at the input 114a thereof and the output 114b thereof is connected by a coupling 115 to an outboard end 108a of the drive shaft 108 such that rotation of the drive motor 110 will rotate the ball screws 98 and they will in turn cause the carriage 86 to slide on bronze pads 116 covering front and rear slide pads 118, 120.

During application of mold pressure, the lower platen 16 is in its solid line vertical position designated 16c in FIGS. 2. In this case, the ball screws 98 are driven by the electric drive motor 110 so as to position the lower platen in the solid line retracted position in which the lower platen and a mold cavity part (MCP) thereon will be vertically aligned with a lid or mold core (MC) such that the parts will be aligned to close the mold when the upper platen 14 is driven vertically downwardly with respect to the lower platen 16. During such closure pressurization of the air pods 88 will compensate for tolerance variations to assure proper mold pressure during a molding process which in one representative case is a reaction injection mold process (RIM) process in which foam precursors such as polyols and isocyanate streams are injected into the mold cavity formed between the MCP and the MC and reacted therein to form a urethane foam part. The mold process can also include the use of compression molding wherein a glass mat is placed within the mold cavity and subject to compression molding during the process. Also the process can be adapted to mold process in which scrim material is placed in the mold for injection of polymers into the interstices thereof.

Another aspect of the invention is that the lower platen 16 is supported at its sides to lower swing plates 122, 124 each pivotally mounted with respect to the drive shaft 108 at journal plates 126, 128 to pivot outwardly of the press frame 12 into a booked position. The lower swing plates 122, 124 are connected by cross braces 127 to form a second inner frame assembly 129 that carries the ball screw system 100. The pivoting action of the lower swing plates 122, 124 is produced by a fourth ball screw drive system 130 for moving the lower platen 16 into its booked position shown in broken outline at 86a in FIG. 2. The ball screw drive system 30 includes a fourth electric drive motor 132 connected to a motor bracket 134 on the bottom of the press frame 12. The electric drive motor 132 is under the control of a motor controller 132a provided in one embodiment as a Allen Bradley 1318-BOA 020 Single Phase Regenerative DC Drive Control with a motor brake and tachometer and whose drive position is established in a known manner by an encoder 132b.

The electric drive motor 132 has its shaft 132a connected by a coupling 136 to a helical gear reducer 138 having its output connected by a coupling 140 to the end of a cross shaft 142 that has its opposite ends journaled in spaced brackets 144, 146. A bevel gear 148 is connected to the cross shaft 142 between the brackets 144, 146. The bevel gear 148 is meshed with a bevel gear 150 on the end of a vertically directed ball screw 152 journaled in brackets 154, 156 connected at spaced points to the press frame 12. The ball screw 152 is threadably received in a fourth drive nut 158 that is connected to a pivot bracket 160 connected to the end of the carriage 86. Rotation of the ball screw 152 will cause the nut to shift vertically therealong to cause the pivot bracket 160 to pivot the carriage 86 into an inclined booked position shown in broken outline in FIG. 2 at 86a. When the carriage 86 is so positioned the electric drive motor 110 is operative to move the lower platen fore and aft on the carriage 86 to provide greater access to the mold part for removing finished parts therefrom.

Each of the electric drive motor controllers 22, 70, 110a and 132a is associated with a programmable computer control 170 for establishing a desired program of movements of the respective upper and lower platens 14, 16 depending upon the types of mold parts carried on the platens and depending on the mold process requirements for access to the parts formed thereon.

Another aspect of the present invention is the provision of lock pin assemblies 172, 174, 176 and 178 for selectively locking the inner frame assembly 36 with respect to the press frame 12 during vertical movement of the upper and lower platens 14, 16. The lock pin assemblies include an actuator 180 and a lock pin 182 connected thereto. The lock pin 182 has a tapered nose 182a that is axially aligned with a conical inlet opening 184 in a lock insert 186 mounted in the swing plates 30, 32. When the mold press is operated in a mold press operation, the lock pin 182 is directed into the lock insert 186 to hold the inner frame assembly 36 in precise vertical alignment with the press frame 12. Likewise, lock pin assemblies 188 are provided between the press frame 12 and the inner frame assembly 129. The lock pin assemblies include component parts corresponding to those in the assemblies 172, 174, 176 and 178 and are operative in the same manner to precisely position the inner frame assembly 129 and the component parts thereof in a locked position during vertical press operation.

The invention employs only electrically driven ball screw drives with encoders for producing feedback signals of the position of the upper and lower platens 14, 16 in either their mold press positions or their booked positions. The system therefore is adaptable for programmable controller operation including logic systems adaptable to a wide range of mold processes.

The ball screw drives are arranged in a compact manner including cross drive shafts that provide the dual function of pivot axis definition for swinging movement of pivoting inner frame assemblies to move the upper and lower platens into their respective booked positions. Furthermore, the ball screw drive of the inventions enable the same ball screw drive to both reciprocate the upper platen during press operation and to retract and extend the upper platen for accessing different sized mold parts thereon. Furthermore, the ball screw drive of the lower platen is operative during booking to both pivot the lower platen and to provide for projection movement of the lower plenum outwardly of the press frame to present the mold thereon to the operator for better access thereto for part removal and mold repair and replacement.

The mold clamp defined by the vertically aligned upper and lower platens 14, 16 and the associated ball screw drives is capable of moving the lid or core insert and the mold cavity part independently for operator ease in loading inserts into the mold cavity part and for demolding finished parts therefrom. The independent movement is precisely programmable for different mold processes and uses ball screw drives for all the platen movements in the mold and book positions.

A representative pour mold press flow chart is shown in FIG. 5. The boxes marked with reference numerals 190, 192, 194, 196, 198, 200, 202, 204 and 206 include legends explaining mold operations that represent mandatory functions in the mold process. The boxes marked with numerals 208, 210, 212, 214, 216, 218, and 220 include legends defining the minimum additional functions required in the mold process. The boxes marked with numerals 222, 224, 226, 228, 230, 232, 234, 236 and 238 include legends explaining mold operations or functions that are optional functions in the mold process of the present invention.

While the present invention has been described with respect to a preferred embodiment, it should be understood that the shape, form and design illustrated herein is merely illustrative of the invention and that the illustrative embodiment is susceptible of other changes and modifications by those ordinarily skilled in the art and it is my intention to be limited neither in description nor in details to those shown and described herein, with it being understood that the invention is that encompassed within the scope of the claims appended hereto.

What is claimed is:

1. In a mold press having vertically moveable upper and lower platens each having opposite sides thereon and a press frame having opposite sides located adjacent the opposite sides of the upper and lower platens for supporting said upper and lower platens for vertical movement thereon the improvement comprising:

first and second ball screw drives located at said opposite sides of said press frame and extending vertically with respect thereto; first and second drive nuts supported on said upper platen;

a first electric drive motor and a first drive shaft connected thereto; said first drive shaft extending across the width of said press frame; journals supporting the opposite ends of said drive shaft in said press frame; a bevel gear coupling said drive shaft to each of said first and second ball screw drives for causing rotation of said first drive shaft to drive said first and second ball screw drives with respect to said first and second drive nuts for vertically reciprocating said upper platen with respect to said press frame;

a first inner frame for supporting said upper platen, said first and second ball screw drives, said first and second drive nuts and said bevel gear; and a pivot drive including said first drive shaft for pivoting said first inner frame with respect to said press frame for pivoting said upper platen with respect to said press frame for access to said upper platen.

2. In the mold press of claim 1, said pivot drive including a third ball screw drive, a second electric drive motor and a third drive nut on said first inner frame, said third drive nut offset from said first drive shaft for forming a crank for pivoting said first inner frame with respect to said first drive shaft for providing outward pivoting movement of said first inner frame with respect to said press frame.

3. In the mold press of claim 1, a pin for interlocking said first inner frame to said press frame during vertical reciprocation of said upper platen with respect to said press frame.

4. In the mold press of claim 1, a fourth ball screw drive for pivoting said lower platen with respect to said press frame following outward pivoting movement of said first inner frame; said fourth ball screw drive including a third electric drive motor.

5. In the mold press of claim 1, a fourth ball screw drive for pivoting said lower platen with respect to said press frame including a second inner frame and a fifth ball screw drive for reciprocating said lower platen with respect to said inner frame for accessing said lower platen.

6. In the mold press of claim 1, a fourth ball screw drive for pivoting said lower platen with respect to said press frame following outward pivoting movement of said first inner frame for providing access to said lower platen; said fourth ball screw drive including a third electric drive motor, a vertically oriented ball screw, a fourth drive nut and a second drive shaft extending across the width of said press frame; said vertically oriented ball screw and said fourth drive nut driving said lower platen upwardly and said second drive shaft forming an axis for pivotal movement of said lower platen.

7. In the mold press of claim 1, a fourth ball screw drive for pivoting said lower platen with respect to said press frame including a second inner frame and a fifth ball screw drive for reciprocating said lower platen with respect to said second inner frame and said fourth ball screw drive including a third electric drive motor and a second drive shaft extending across the width of said press frame; said fifth ball screw drive including spaced ball screws supported on said second inner frame and fifth drive nuts threadably engaging said fifth spaced ball screws for causing said lower platen to be reciprocated into and out of said second inner frame so as to access said lower platen.

8. In the mold press of claim 2, a fourth ball screw drive for pivoting said lower platen with respect to said press frame following outward pivoting movement of said first inner frame for providing access to said lower platen; said fourth ball screw drive including a third electric drive motor, a vertically oriented ball screw, a fourth drive nut and a second drive shaft extending across the width of said press frame; said vertically oriented ball screw and said fourth drive nut driving said lower platen upwardly and said second drive shaft forming an axis for pivotal movement of said lower platen.

9. In the mold press of claim 6, a pin for interlocking said first inner frame to said press frame during vertical reciprocating of said upper platen with respect to said press frame.

10. In the mold press of claim 2, a fourth ball screw drive for pivoting said lower platen with respect to said press frame including a second inner frame and a fifth ball screw drive for reciprocating said lower platen with respect to said second inner frame; said fourth ball screw drive including a third electric drive motor and a second drive shaft extending across the width of said press frame; said fifth ball screw drive including spaced ball screws supported on said second inner fame and fifth drive nuts threadably engaging said spaced ball screws for causing said lower platen to be reciprocated into and out of said second inner frame so as to access said lower platen.

11. In the mold press of claim 7, a pin for interlocking said first inner frame to said press frame during vertical reciprocating of said upper platen with respect to said press frame.

12. In the mold press of claim 1, said first inner frame having a plurality of guide inserts therein each having a bore with a conical inlet; and a lock pin carried by said press frame for reciprocating interiorly thereof through said conical inlet for interlocking said first inner frame to said press frame.

13. In the mold press of claim 2, said first inner frame having a plurality of guide inserts therein each having a bore with a conical inlet; and a lock pin carried by said press frame for reciprocating interiorly thereof through said conical inlet for interlocking said first inner frame to said press frame.

14. In the mold press of claim 6, said first inner frame having a plurality of guide inserts therein each having a bore with a conical inlet; and a lock pin carried by said press frame for reciprocating interiorly thereof through said conical inlet for interlocking said first inner frame to said press frame.

15. In the mold press of claim 7, said first inner frame having a plurality of guide inserts therein each having a bore with a conical inlet; and a lock pin carried by said press frame for reciprocating interiorly thereof through said conical inlet for interlocking said first inner frame to said press frame.

* * * * *